United States Patent [19]

Rasmussen et al.

[11] 3,830,466
[45] Aug. 20, 1974

[54] CAMPER SUPPORT METHOD

[76] Inventors: Reed Rasmussen, 1 W. Gentile, Layton, Utah 84041; Carl M. Rasmussen, 583 E. 1st., South, Kaysville, Utah 84034

[22] Filed: June 18, 1973

[21] Appl. No.: 371,000

Related U.S. Application Data

[62] Division of Ser. No. 177,957, Sept. 7, 1971, Pat. No. 3,765,648.

[52] U.S. Cl. .................................. 254/1, 254/47
[51] Int. Cl. ............................................ B66f 7/26
[58] Field of Search ............. 254/47, 148; 214/515; 187/8.59

[56] References Cited
UNITED STATES PATENTS

| | | | |
|---|---|---|---|
| 2,648,521 | 8/1953 | Sales | 254/47 |
| 3,164,275 | 1/1965 | Schatzl | 254/47 |
| 3,305,216 | 2/1967 | Gennard | 254/47 |
| 3,414,087 | 12/1968 | Schmiesing | 254/148 |

*Primary Examiner*—Al Lawrence Smith
*Assistant Examiner*—Robert C. Watson
*Attorney, Agent, or Firm*—H. Ross Workman

[57] ABSTRACT

Elevating and leveling method for campers and other transportable objects in one preferred embodiment including a plurality of telescoping legs, one of which is extended and retracted by power means. A cable is anchored to another telescoping leg and traverses stationary-axis pulleys so that the other leg extends and retracts concurrently with the one leg. In another presently preferred embodiment, a plurality of telescoping legs are mounted upon the transportable object and the extensible portion of each telescopic leg is provided with a pulley near the upper end the fixed portion of each leg is provided with a pulley near the lower end. A cable traverses each pulley and extends between the legs so that when the cable is shortened or displaced out of its normal path, each of the legs will simultaneously extend to uniformly lift the transportable object. Conversely, when the length of the cable is increased or when the cable is allowed to resume its normal path, the legs will simultaneously retract. The method includes jointly extending or retracting telescoping legs by displacing a cable connecting the legs. Alternatively, the method includes power displacing one leg and causing simultaneous displacement of another leg through a connecting cable.

4 Claims, 5 Drawing Figures

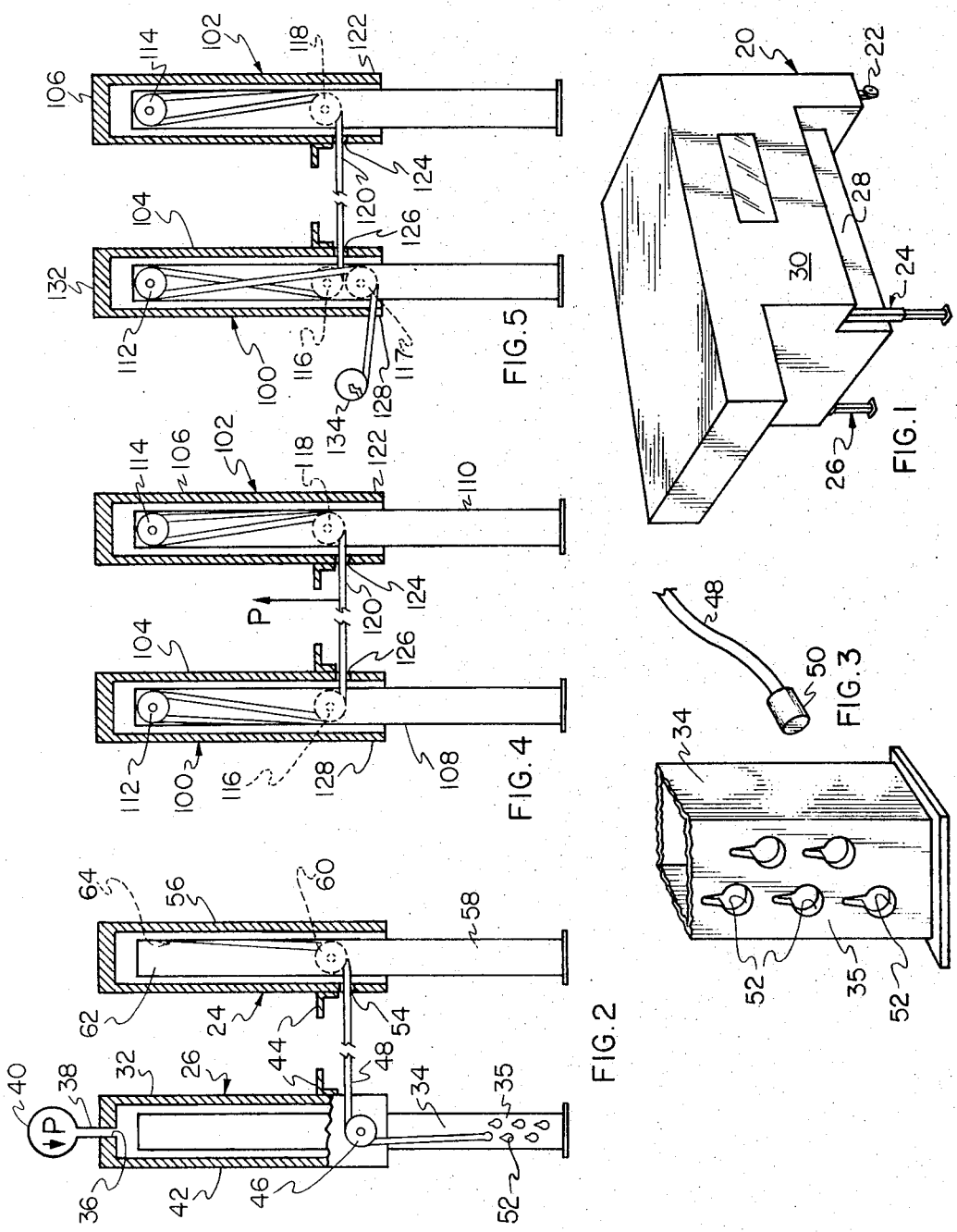

CAMPER SUPPORT METHOD

This is a division of application Ser. No. 177,957, filed Sept. 7, 1971, now U.S. Pat. No. 3,765,648.

BACKGROUND

1. Field of the Invention

This invention relates to support methods and more particularly to methods of elevating and lowering a transportable object such as a camper and for quickly and easily leveling the object, when desired.

2. The Prior Art

It has long been desirable for truck campers to have supporting legs which support the camper in a generally horizontal orientation after the camper has been removed from a truck bed. In supporting the camper in a preferred orientation upon the ground, there are two specific processes which require attention. First of all, the elevation of the camper must be adjusted to a preferred height after the camper has been removed from the truck. Secondly, once the preferred elevation is established, each of the support legs which carries the camper must be adjusted so that the camper is substantially level.

One of the common ways in which campers are supported is by placing a leg at each corner of the camper, the leg being held by a conforming bracket. In using support apparatus of this type, it has historically been the practice to extend two of the legs adjacent the rear of the camper to approximately the preferred elevation for the camper and, thereafter, tightening the brackets so that the leg has no opportunity for vertical movement. Thereafter, either before or after the camper has been totally removed from the truck, the front legs are adjusted and tightened in the vertical position. The camper is then leveled by individually adjusting the extension of each of the corner legs.

Desirable improvements have been recently made to include telescoping legs, each being independently extensible by use of a screw or the like to adjust the height of the camper. An example of this type leg is illustrated in U.S. Pat. No. 3,409,272. Unfortunately, however, in order to adequately adjust the elevation of the camper and also in order to level the camper, each of the extensible legs must be individually and separately adjusted.

The telescoping leg structure has been modified to include various types of power means for extending the leg, including hydraulic power means. Nevertheless, until this present invention, it was necessary for the extension of each of the legs to be independently adjusted. Independent adjustment of the legs can be a severe disadvantage. Not only is the process tedious, consuming much time and energy, but a danger exists when, for example, one of the legs becomes shortened too quicky. In that event there is a substantial risk that the camper can tumble to one side, causing damage to the camper and risking injury to the operator.

BRIEF SUMMARY AND OBJECTS OF THE INVENTION

The present invention provides extensible support structure attached to a camper or other transportable object at a plurality of locations on the camper or object. The support structure elevates or lowers the camper or other transportable object at the plurality of locations, simultaneously. Moreover, method is provided for quickly and easily leveling the camper either concurrently with the elevating step or independent of the elevating step.

It is a primary object of the present invention to provide novel methods for elevating and leveling a transportable object.

This and other objects and features of the present invention will become more fully apparent from the following description and appended claims taken in conjunction with the accompanying drawings.

BRIEF DESCRIPTION OF THE DRAWINGS

FIG. 1 is a schematic perspective illustration of a conventional camper unit supported by structure according to the present invention;

FIG. 2 is a schematic elevation of presently preferred apparatus accommodating concurrent extension and retraction of support legs;

FIG. 3 is a fragmentary perspective illustration of one presently preferred mode of attaching a cable to a telescoping support leg; and FIGS. 4 and 5 schematically illustrate alternative self-leveling leg embodiments of the invention.

DETAILED DESCRIPTION OF THE PREFERRED EMBODIMENTS

The Embodiment of FIGS. 1-3

While the support method comprising the present invention can be used on any one of a wide variety of transportable objects, the most common use of the illustrated embodiments has been in connection with truck campers such as a camper generally designated 20 illustrated in FIG. 1. The camper 20 comprises rear legs 22 and forward legs 24 and 26, respectively. The legs 24 and 26 are shown as mounted to the camper body along the recessed wall 28. Clearly, however, the leg 24 may be mounted at any suitable location on the camper including the peripheral side edge 30.

Referring now to FIG. 2, the support legs 24 and 26 are schematically shown. Support leg 26 has an exterior housing 32 into which an extensible inner member 34 is telescopically disposed. The exterior housing 32 has a port 36 into which is connected a fluid line 38 interposed between the housing 32 and a conventional fluid pump 40. A fluid seal 42 is mounted peripherally upon the inner wall of the housing so as to maintain fluid from pump 40 between the inner member 34 and the interior walls of the housing 32. Thus, it can be appreciated that the housing 32 comprises a hydraulic cylinder, the extensible leg 34 forming the cylinder piston.

When pressure is forced into the housing 32, the extensible leg 34 will extend telescopically out of the housing 32. Preferably, opposing brackets 44 are mounted upon the exterior housing 32 and also upon the exterior housing 56 to form support plates for the body of camper 20.

A pulley 46 is rotatably mounted upon the exterior surface of the housing 32. The pulley accommodates a cable 48, preferably formed of metal or other durable material. The cable 48 has, at its one end, an integral nub 50 shown best in FIG. 3. The nub 50 has a diametral dimension which is larger than the diameter of cable 48 and is used to anchor the cable 48 to the extensible inner member 34 of leg 26. As shown in both FIGS. 2 and 3, leg 46 has a plurality of spaced apertures 52, which have a tapered portion near the top thereof. The apertures 52 are sufficiently large to accommodate insertion of the nub 50 and at the same time prevent inadvertent disengagement of the nub 50 when the cable 48 is urged into the tapered portion of the aperture.

As illustrated in FIG. 2, the cable 48 is stretched between support leg 26 and support leg 24. The cable 48 passes through an aperture 54 in the exterior housing 56 of leg 24. Housing 56 is substantially similar to housing 32 except that housing 56 does not include a hydraulic system for telescopically displacing the inner member 58 of support leg 24. Instead, the exterior housing 56 is internally provided with a rotatable pulley 60, shown in dotted lines in FIG. 2. The cable 48 traverses the pulley 60 and is anchored in the upper end 62 of the extensible inner member 58. If desired, the other end of cable 48 may be provided with a nub 64 which anchors into a tapered aperture in the upper end 62 of inner member 58 in a manner substantially similar to the anchoring of the one end 50 into the inner member 34 illustrated in FIG. 3. Furthermore, if desired, the pulley 60 may be located exterior of housing 56.

The method of FIGS. 1–3 can best be understood by referring again to FIG. 2. As pressure is communicated from the pump 40 to the interior of the housing 32, the inner member 34 is forced downwardly as shown in FIG. 2. As the inner member 34 extends, the cable 48, anchored to the lower end 35 of the extensible inner member 34, is moved toward the left as shown in FIG. 2. Concurrently, the cable exerts a downward force on the extensible inner member 58 of the support leg 24. Thus, the leg 24 extends concurrently with leg 26, even though hydraulic pressure is directly applied only in leg 26.

When the one end of cable 50 is anchored in one of the central apertures as shown in FIG. 2, the effective length of legs 24 and 26 will be substantially identical. However, if the camper is not on level ground, it may be desirable to anchor the cable 48 in other apertures. For example, if the nub 50 of cable 48 were anchored in the uppermost aperture, leg 26 could extend several inches before leg 24 would begin to extend concurrently with leg 26. Conversely, if the nub 50 were anchored into the lowermost aperture of the extensible member 34, the leg 24 would be extended so as to have an effective length of as much as several inches longer than leg 26. If desired, leg 24 can be rested on a pin or other restraint (not shown) and the cable 48 can be disconnected and leg 26 operated independently to facilitate leveling.

Support legs 24 and 26 are illustrated for convenience as being mounted near the front of the camper. Clearly, the legs could be mounted near the rear of the camper. Furthermore, it is within the scope and contemplated use of this invention to connect a plurality of cables to the power leg 26 to be connected to dependent legs, for example, near each of four corners of the camper 20. Of course, a mechanical winch system could be used to extend and retract the leg 34 in place of the hydraulic system illustrated in FIG. 2 to accommodate the method of this invention.

The Embodiment of FIGS. 4 and 5

The embodiment of FIGS. 1–3, above described, discloses one leg which is power-displaced to an extended and/or retracted position and a secondary or dependent leg which is extended or retracted in response to the energy or force applied to the first leg (see FIG. 2). The embodiment of of FIGS. 4 and 5 differs from the foregoing embodiment principally in that the extensible force conducted essentially uniformly through both legs is dependent upon a displacing force exerted upon a connecting cable.

The differences will be more specifically understood by reference to FIG. 4. As shown in FIG. 4, legs generally designated 100 and 102 are schematically illustrated in side-by-side relation. It should be appreciated that although two legs are shown any plural number of legs in excess of two could be used according to the present invention. Each leg has an exterior housing or receiving member 104 and 106. Similarly, each leg 100 and 102 has a corresponding inner telescoping member 108 and 110. Each of the inner telescoping members 108 and 110 has a corresponding pulley 112 and 114, respectively adjacent the upper end thereof. Similarly, each of the exterior members 104 and 106 has a corresponding pulley 116 and 118 rotatably journaled thereto. The pulley may be exterior or interior of the members 104 and 106, as desired.

A connecting cable 120 has one end anchored to the exterior member 106 intermediate the length of the member, preferably adjacent the lower end 122. The cable 120 traverses the upper pulley 114, the pulley 118 and, where pulley 118 is an interior pulley, projects through an aperture 124 in the exterior member 106.

The cable then enters the exterior member 104 through an aperture 126, similar in intent and purpose to aperture 124. The cable traverses the pulleys 116 and 112 and is anchored to the member 104 adjacent its lower end 128. Preferably, conventional structure is connected to an intermediate length of the cable 120 so as to displace the cable 120, for example, in the direction of arrow P, when desired. An example of suitable conventional structure may include a hydraulic cylinder (not shown) mounted adjacent the bottom of camper 20 (FIG. 1), the extensible piston of which is attached to the intermediate portion of cable 120. When the cylinder piston (not shown) is extended, the cable 120 is displaced out of its natural path thereby exerting a displacing force on the cable so as to urge the pulleys 112, 116 and 114, 118 toward one another. The mentioned displacement will extend the inner members 108 and 110 thereby lengthening the supporting legs 100 and 102. Conversely, when the cable 120 is allowed to resume its natural position, natural weight of the camper on the legs 108 and 110 will telescope the inner members into the exterior members 104 and 106.

This presently preferred embodiment of the invention has a particular advantage worth noting. If a camper having supporting legs 100 and 102 is situated upon uneven or sloping terrain, displacement of the cable 120 will cause the support legs 100 and 102 to extend ununiformly until each engages the ground. One of the support legs 100 and 102 may be required to extend several inches beyond the other before both legs engage the ground. Thus, it is presently preferred that lateral or "in line" displacement of the cable 120 be accommodated even during the step of forcing the cable out of its natural path. As long as the cable has freedom for "in line" displacement, legs 100 and 102 can extend one independent of the other until the ground is engaged. Thereafter, continued displacement of cable 120 will cause an equal force to be exerted through the support legs so that the camper remains level as it is elevated even though the ground surface supporting the camper is not level.

Reference is now made to the embodiment of FIG. 5 which is substantially the same in many respects as the embodiment of FIG. 4, like parts having like numerals throughout. The FIG. 5 embodiment differs from the FIG. 4 embodiment particularly in that the cable 120 is projected through an aperture (not shown) adjacent the lower end 128 of leg 100. The cable 120, after traversing pulleys 112 and 117, projects through the aperture (not shown) and is connected to a take-up mandrel or winch 134. Extension and retraction of the support legs 100 and 102 occurs substantially as described in the FIG. 4 embodiment except that the cable 120 is shortened or lengthened depending upon the direction of rotation of the winch 134.

Clearly, the operation of support legs 100 and 102 is not dependent upon the type of apparatus used for displacing the cable 120. Rather, any suitable apparatus for displacing the cable which exerts a closing force between pulleys 112, 116 and 114, 118 is suitable.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of uniformly lifting and lowering a transportable object supported upon uneven terrain, the steps of:
   a. providing supporting legs at predetermined spaced locations on the transportable object, each supporting leg having a second member initially independently longitudinally displaceable relative to a corresponding first member;
   b. displacing the second member of each leg a nonuniform distance accommodating leveling of the transportable object with respect to the terrain;
   c. connecting the second members of the supporting legs directly together with an unbroken flexible line so that changes in the effective length of the one leg will cause a corresponding change in the effective length of the other; and
   d. applying a displacing force to one supporting leg so that the second member is displaced relative to the first to change the effective length of the supporting legs.

2. A method as defined in claim 1 further comprising selectively disconnecting the flexible line from one of the legs and reconnecting the flexible line to the one leg to facilitate independent displacement of the telescoping member of the one leg whereby the transportable object, when positioned at a desired orientation, is easily reoriented by selectively adjusting the location of the line attachment.

3. A method of uniformly lifting and lowering a transportable object supported upon uneven terrain, the steps of:
   providing supporting legs at predetermined spaced locations on the transportable object, each supporting leg having a second member longitudinally movable relative to a first member;
   connecting the supporting legs together with a flexible line so that displacement of the line will urge each second member toward an extended ground-engaging position, one second member extending a greater distance than the other; and
   selectively exerting a displacing force on the flexible line to lift the object.

4. A method as defined in claim 3 further comprising simultaneously extending each supporting leg from an initial position into ground engagement so that at least two of the supporting legs engage the ground before an object-lifting force is exerted by the legs; and developing an object-lifting force which is essentially uniform in each of the supporting legs by displacing the flexible line.

* * * * *